G. W. FERDON.
ELASTIC SPRING CLAMPING CATCH HOLDER.
APPLICATION FILED MAY 27, 1919.
1,350,713.
Patented Aug. 24, 1920.
2 SHEETS—SHEET 1.
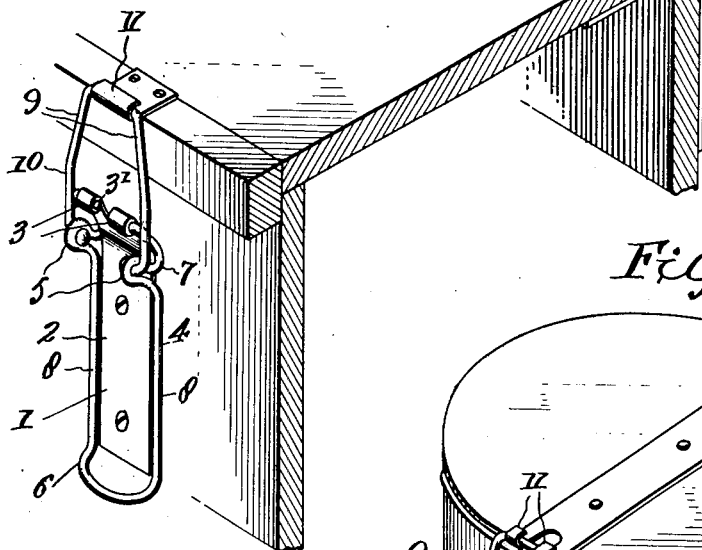
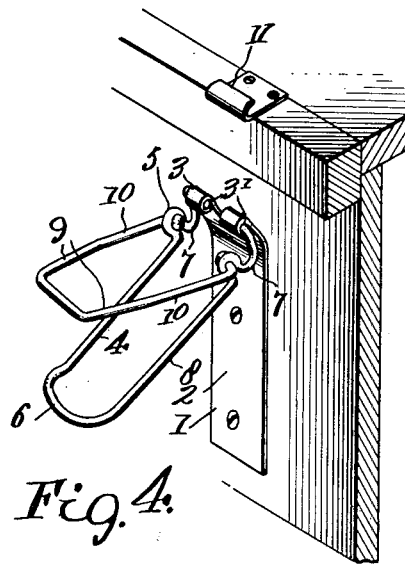
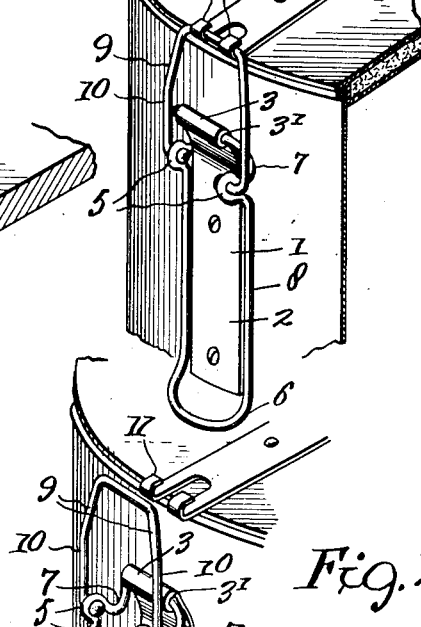
Inventor
Guy W. Ferdon G. W. FERDON.
ELASTIC SPRING CLAMPING CATCH HOLDER.
APPLICATION FILED MAY 27, 1919.
1,350,713.
Patented Aug. 24, 1920.
2 SHEETS—SHEET 2.
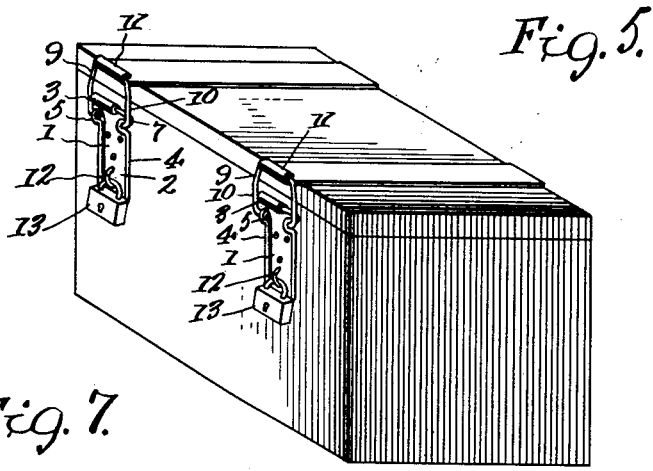
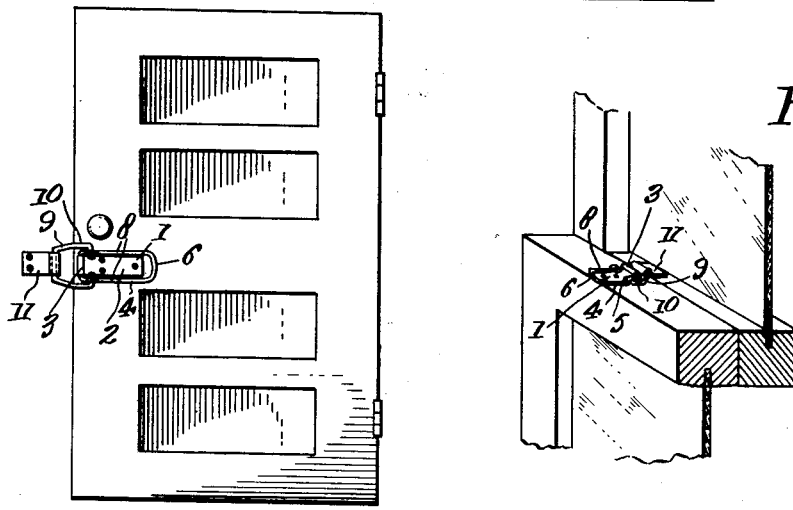
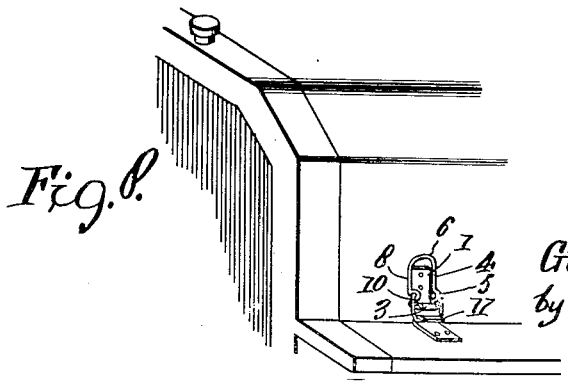
Inventor.
Guy W. Ferdon.

UNITED STATES PATENT OFFICE.

GUY W. FERDON, OF CRESSKILL, NEW JERSEY.

ELASTIC-SPRING-CLAMPING-CATCH HOLDER.

1,350,713.  Specification of Letters Patent.  Patented Aug. 24, 1920.

Application filed May 27, 1919. Serial No. 300,147.

*To all whom it may concern:*

Be it known that I, GUY W. FERDON, a citizen of the United States, residing at Cresskill, county of Bergen, State of New Jersey, have invented certain new and useful Improvements in Elastic-Spring-Clamping-Catch Holders; and I do hereby declare the following to be a full, clear, and exact description of the invention, such as will enable others skilled in the art to which it appertains to make and use the same.

My invention relates to a clamping and locking device for clamping and holding or locking together two separable parts or objects.

My invention is adapted for establishing a firm and secure clasping or clamping action whenever two parts are intended to be drawn together with enough force to establish a tight joint. At the same time I provide means whereby the device may be readily opened and the parts separated for opening or removal.

I adapt my clamping device to be used in many relations, for instance, clamping the doors of refrigerators, of food containers, of steam pressure cookers, strong boxes, the meeting rails of window sashes, automobile radiator hoods, doors of dwellings, and in other similar relations.

My invention consists primarily in a lever made of strong elastic material, pivoted in an ear piece of strong and elastic material, carrying a bail or loop also made of slightly elastic material, and this bail engages a hook secured to another part, and this also may be slightly elastic. The ear piece is secured to one part and the hook to another, or fireless cooker.

In the drawings:

Figure 1 shows my device applied to a marmite or food container.

Fig. 2 shows the same device with the lever partly open.

Fig. 3 shows the same device applied to a refrigerator or ice box door.

Fig. 4 shows the same device partly open.

Fig. 5 shows the device provided with a lock and applied to a strong box.

Fig. 6 shows the device adapted to meeting rails of sashes.

Fig. 7 shows the device applied to the door of a house; and

Fig. 8 shows it applied to the hood of an automobile radiator.

In the drawings, my device is represented generally by the numeral 1. I provide an ear piece 2 which has an outstanding part 3 which is turned over or coiled on its own length as it were thereby forming an eye 3'. This ear piece is elongated, *i. e.* is extended in the direction of the lever below referred to so as to enable the pail or other sheet metal article to which it is secured to take the strain in the direction of the lever, and to distribute the strain throughout as great an extent as possible of the metal. The projecting arm extends obliquely outward at the angle which best adapts itself to distribute the strain. In this eye 3' I provide a lever 4 made of a single piece of stout but slightly elastic wire, bent into a general hair pin form, with the ends bent to enter the eye 3' and form the pivot therein. In the length of said lever and near the pivot end, I bend the wire into open, elasticity-affording curves, opening outward and next I bend the wire in its own plane of direction to form nearly closed loops, *i. e.*, the lower parts are brought substantially together and by these closed loops I provide sockets or eyelets 5 which are axially continuous, and at the bottom I may bend the tip end out as shown at 6, so as to afford a convenient means for engagement with the fingers. This lever is so proportioned with respect to the ear piece that it spans or straddles the ear piece when it is in locking position, as shown in Fig. 1, and thus lies in approximately the same plane as the main part of said ear piece.

The shorter arm of the lever is bent, as shown at 7, on both sides to make the open curve mentioned above and to give the stiff lever at this point a certain degree of elasticity, but these bent portions 7 should not extend beyond the plane of the straight part of the longer arm 8, as otherwise it may interfere with the action of the device.

This construction of lever provides for a strong substantially rigid lever, yet one that possesses slight elasticity. The ear pieces are also of slightly elastic material.

In the lever sockets 5 referred to I mount the ends which, as shown, may be upset, of the bail or loop 9, this loop being also made of a continuous piece of stout wire, preferably of the same gage as the lever, and this loop is slightly bent at 10, as shown, so as to make it slightly elastic. The further end of the bail is adapted to engage the coöperating hook, or part, secured to the other part or object when two are to be drawn together. This hook should take a form best adapted for the use for which it is to be put; thus, in Figs. 2 and 3, it is given one, in Fig. 7 another, and in Fig. 6, still another. The hook should be bent in at all times enough to afford a sufficient bearing for the loop or bail. This hook is numbered 11. It may also be slightly elastic.

It will be noted that the outstanding part of the ear piece in Fig. 1, extends beyond the line of the hook and the lever sockets 5. That is, when the hook is in position opposite the ear piece, as shown in Fig. 1, it forms a pivot for the bail 9, and the arc of movement of said pivot is defined by the path of movement of the unbent ends of said bail. At the same time the outbent ear piece forms the center for the arc of movement of the shorter arm of the lever or of the lever sockets. This arm has a wider angle but a shorter radius. The same object, namely, the inturned ends of the bail, defines or tends to define both these arcs.

Now, these arcs can be coincident only at one point. The arc of shorter radius should extend beyond the arc of larger radius at the time when the three pivots, namely, the hook, the ear socket, and the lever socket, are in line. After this point is passed the effect is felt or maintained. At the same time to release the device, all that is necessary is to lift the lower part by the outstanding portion 6 until the pivot at 5 passes in the pivot at 3', and the device is readily opened.

The bail part 9 may serve as a handle for lifting the device shown in Fig. 1, and the lever itself may serve for the same purpose. The device, when used in a door as shown in Fig. 7, performs the functions of a chain bolt, in that by releasing the lever 4 slightly, the door may be opened far enough for one to peer through and immediately locked, if desired, against any intruder.

Similar objects are to be found in other cases.

In the form or application shown in Fig. 5, I provide in piece 2 a staple 12, which may be used for a padlock 13, which should be large enough to bridge across the loop part of the lever.

The construction is such that by a comparatively slight movement, a very powerful drawing or clamping effect is produced. If the hook is set at the most approved place, the drawing action of the lever is enhanced by the elastic feature of all three parts. The lever yields a little, the ear piece yields a little, and in extreme cases the bail and hook may yield a little, under the powerful clamping action. The inturned ends of the bail or loop 9 in sockets 5, are riveted or upset as shown at 5' for greater security.

It will thus be seen that I have devised a simple, economical, and efficient clamping device for the uses specified, and other uses.

Having thus described my invention, what I claim as new and desire to secure by Letters Patent of the United States, is:

1. A clamping and locking device comprising in combination, a socketed ear of elastic material, the socket part extending away from one of the parts to be clamped, a wire lever pivoted in said socket, said lever having near its pivot, elasticity giving curves next to said pivot, and a socket formed by nearly closed loops bent inwardly in the length of said lever, a bail or loop pivoted in the lever socket, the lever pivot part extending parallel to the ear pivot part, and a hook adapted to coöperate with said bail.

2. A clamping and locking device comprising in combination, an ear piece adapted to be secured to a face of the part to be locked and having an outstanding ear piece having an ear at its end coiled therein in its own plane, a lever of stout wire doubled, having its ends pivoted in said ear, said lever being bent to form a nearly closed loop and thereby to form in its length a bail socket, said loops opening inward extending not so far as the ear socket, and having its inner faces both sides the loop adapted to be in the same plane as the ear piece, an elastic bail piece pivoted in said lever socket, and a hook coöperating with said bail piece.

3. In a fastening and locking device for holding two parts or objects together, in combination, an ear plate adapted to be fastened to one part and having an elongated body and at its upper end a slightly elastic outstanding part bent in its own plane at the end to form an eye, a lever formed of stiff wire with its ends bent inward to enter said eye, said wire provided in its length near the inbent ends with elasticity giving loops, eyelets formed of nearly closed loops bent inwardly in the length of the lever, a bail formed of wire having ends pivoted in said eyelets, at its inbent ends, and adapted to be fastened to the second part a device for engagement with said loop.

In testimony whereof I affix my signature.

GUY W. FERDON.